(12) United States Patent
Huang

(10) Patent No.: US 7,230,758 B2
(45) Date of Patent: Jun. 12, 2007

(54) TOTAL INTERNAL REFLECTION FRESNEL-LENS AND DEVICES

(75) Inventor: Yu Huang, Los Angeles, CA (US)

(73) Assignee: Luminoz, Inc., Tokyo (JP)

( * ) Notice: Subject to any disclaimer, the term of this patent is extended or adjusted under 35 U.S.C. 154(b) by 0 days.

(21) Appl. No.: 11/171,070

(22) Filed: Jun. 30, 2005

(65) Prior Publication Data

US 2006/0007536 A1    Jan. 12, 2006

Related U.S. Application Data

(66) Substitute for application No. 60/585,621, filed on Jul. 6, 2004.

(51) Int. Cl.
  *G03B 21/60*  (2006.01)
  *G03B 21/56*  (2006.01)
(52) U.S. Cl. .................. 359/457; 359/459; 359/460
(58) Field of Classification Search ............... 359/457, 359/443, 454–456, 459–460
  See application file for complete search history.

(56) References Cited

U.S. PATENT DOCUMENTS

| | | | |
|---|---|---|---|
| 4,531,812 A * | 7/1985 | Oguino | 359/457 |
| 5,870,224 A | 2/1999 | Saitoh et al. | |
| 6,407,860 B1 * | 6/2002 | Funazaki et al. | 359/457 |
| 6,726,859 B2 | 4/2004 | Suzuki et al. | |
| 6,989,929 B2 * | 1/2006 | Watanabe | 359/457 |
| 2005/0046939 A1 * | 3/2005 | Yoshikawa et al. | 359/457 |

* cited by examiner

*Primary Examiner*—W. B. Perkey
*Assistant Examiner*—Magda Cruz
(74) *Attorney, Agent, or Firm*—Pillsbury Winthrop Shaw Pittman LLP

(57) ABSTRACT

An off-axis Fresnel lens is disclosed that, when combined with a rear projection screen (comprising, e.g., a lenticular lens, a diffuser, or both), enables construction of rear-projection-type screen devices (e.g., projection television systems) that are thinner and have improved contrast and resolution when compared with conventional projection screen devices. The off-axis Fresnel lens comprises a plurality of concentric, outwardly-extending, total internal reflection-type prism facets. Each facet, in turn, comprises top and bottom sides, one or both of which may be flat or outwardly convex. Embodiments of the invention may also include concentric opaque sections that are disposed between successive prisms, between the prism base and the output surface of the Fresnel lens, and/or between the output surface of the Fresnel lens and the input surface of the projection screen in order to improve contrast. Contrast may also be enhanced by laminating the Fresnel lens to the projection screen.

33 Claims, 21 Drawing Sheets

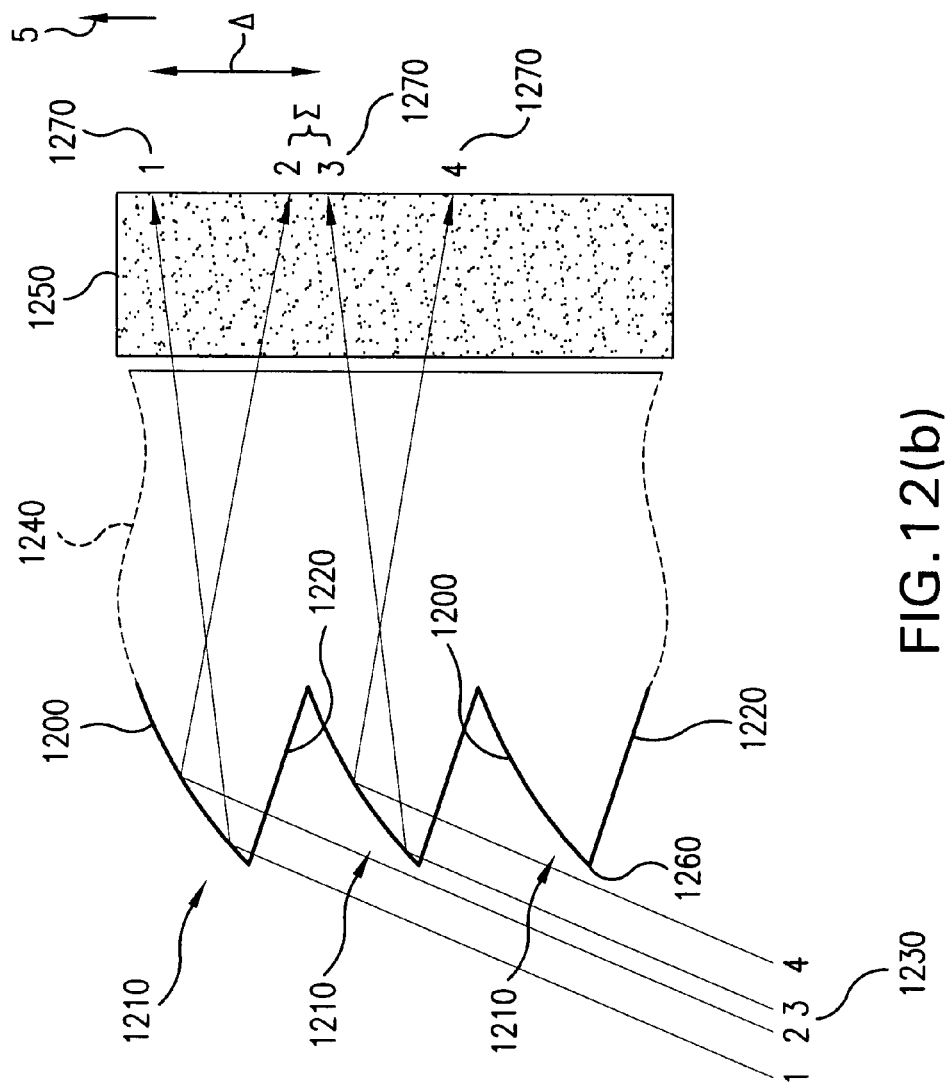
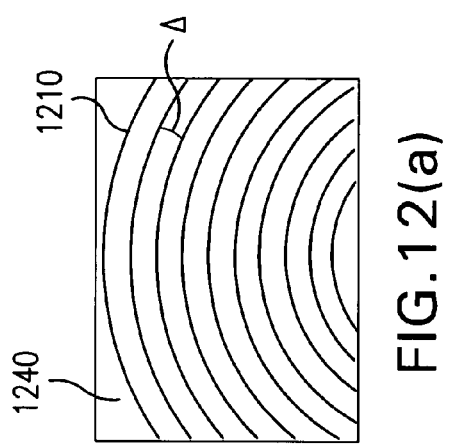
FIG. 12(a)
FIG. 12(b)

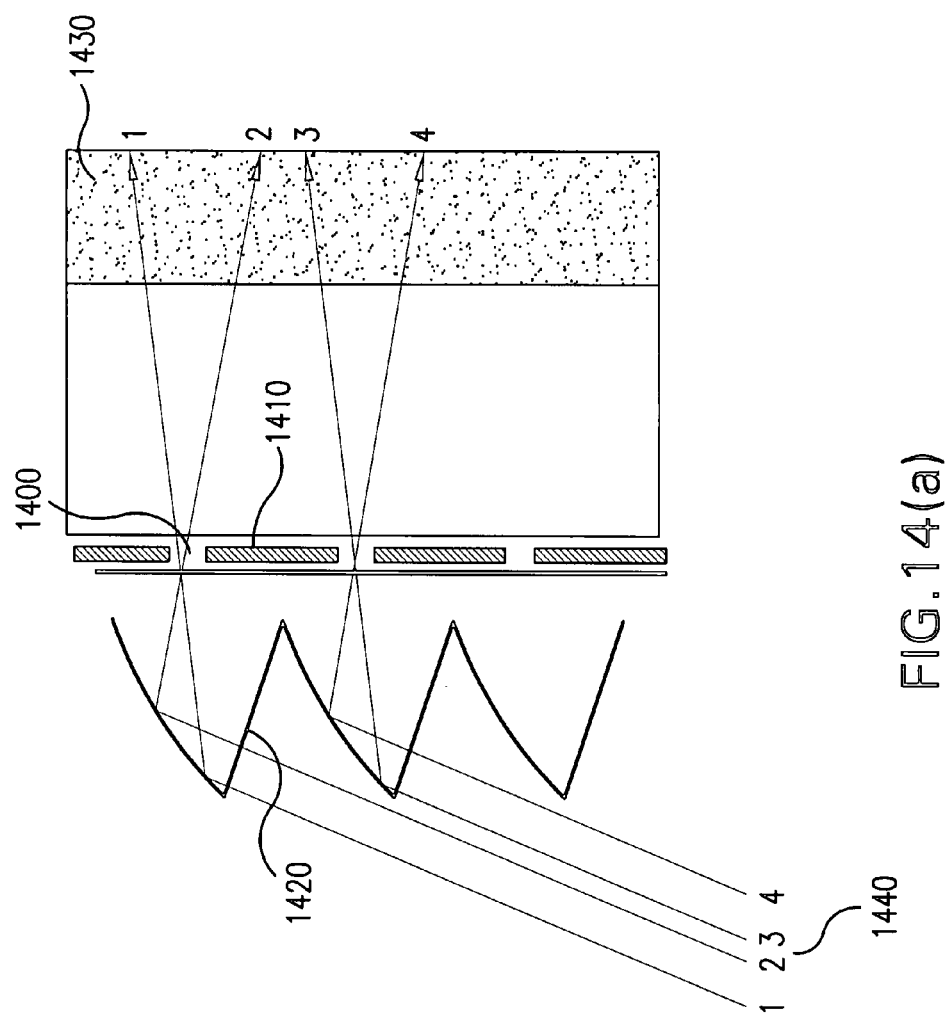
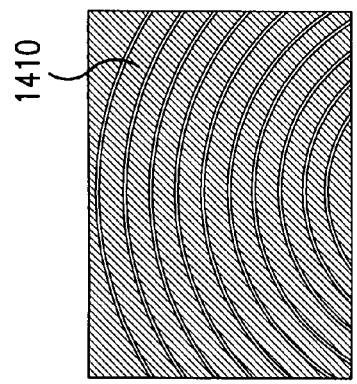
FIG. 14(a)
FIG. 14(b)

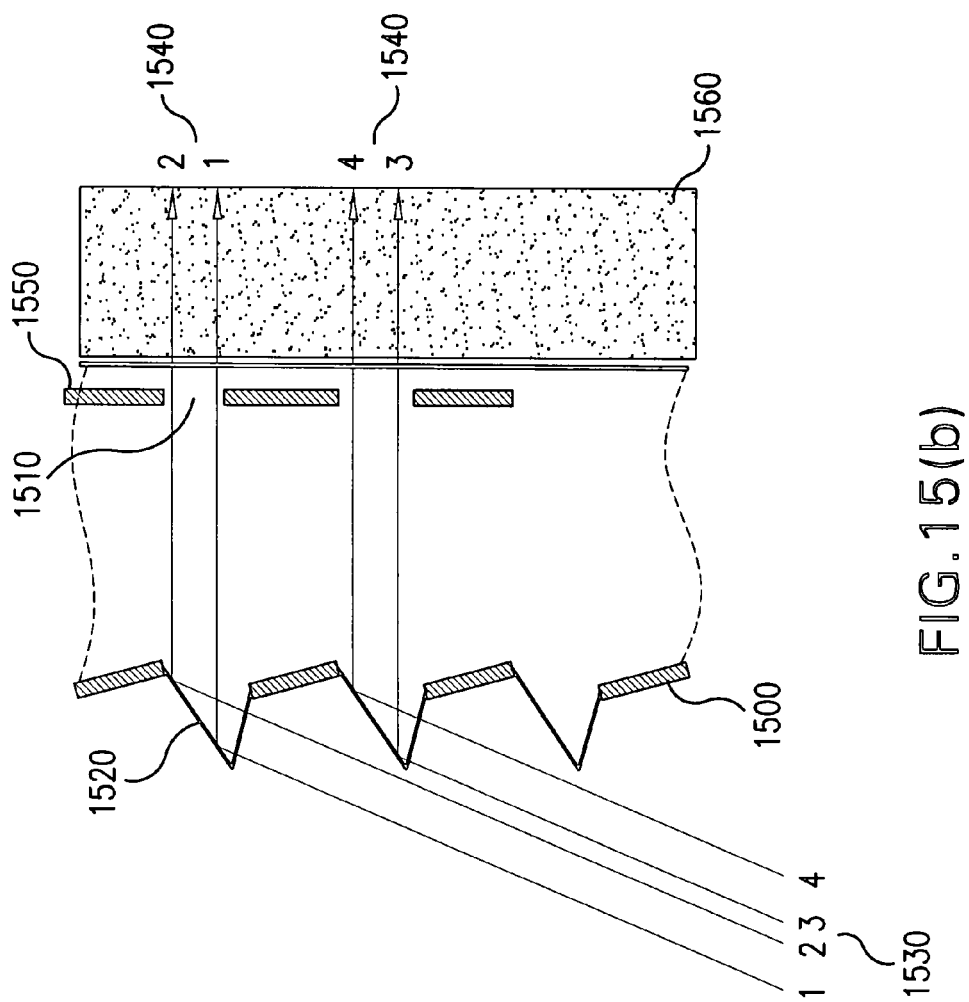
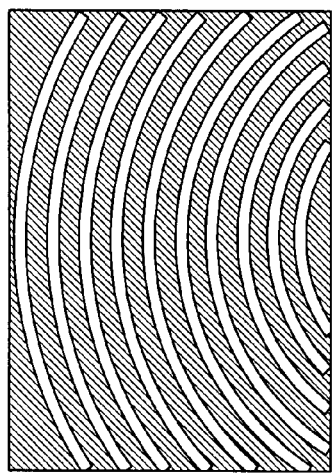
FIG. 15(a)
FIG. 15(b)

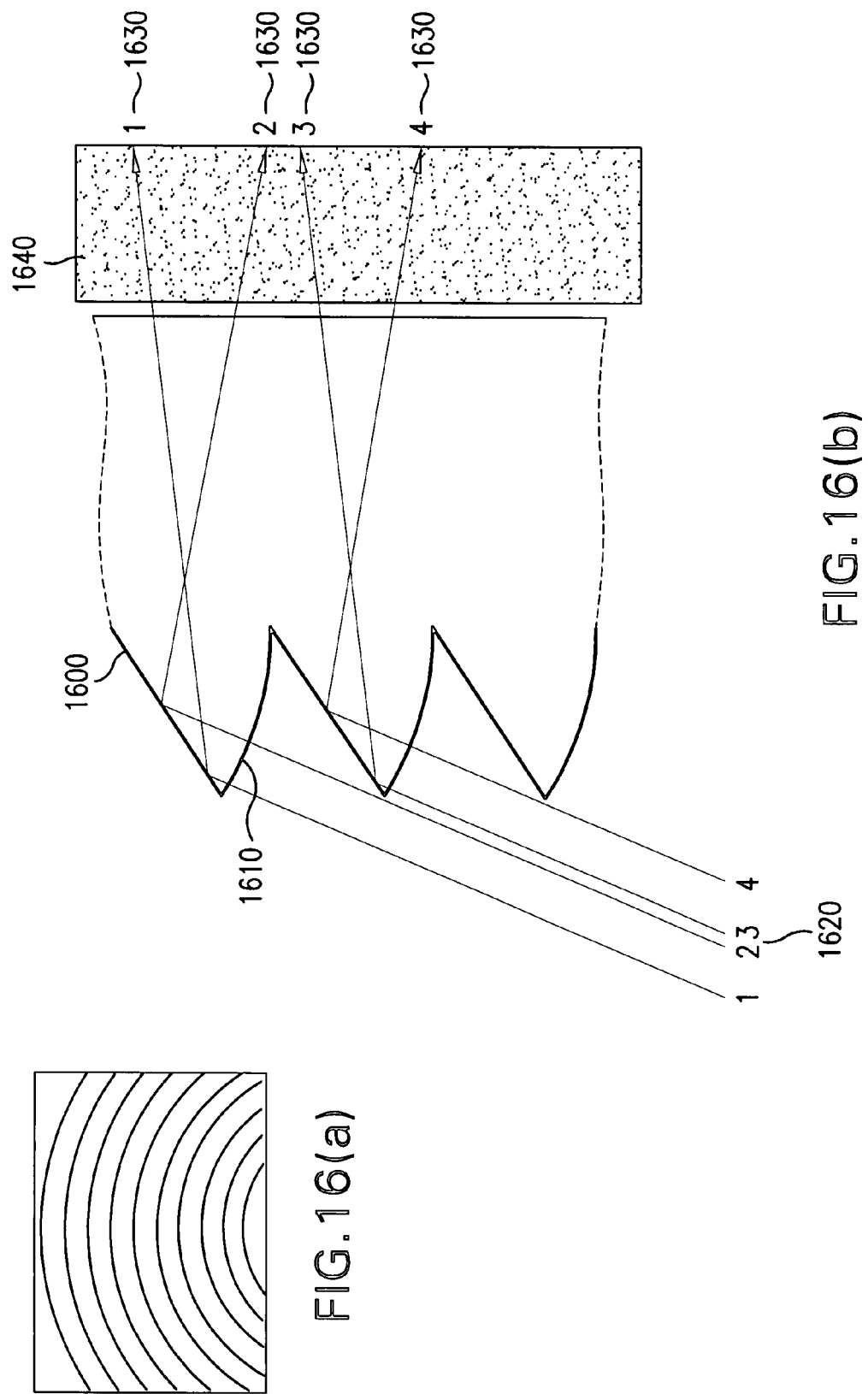

| Area | Incident light angle (deg.) | Distance from prism to axis L (mm) | FACET DEPTH (mm) | Prism top surface angle β (degree) | Prism bottom surface angle φ (degree) |
|---|---|---|---|---|---|
| 1 | 42 | 271 | -0.167 | 29.6 | -1.7 |
| 2 | 46 | 311 | -0.160 | 30.7 | -1.8 |
| 3 | 50 | 357 | -0.153 | 31.8 | -1.9 |
| 4 | 54 | 412 | -0.146 | 33.0 | -2.0 |
| 5 | 58 | 478 | -0.140 | 34.2 | -2.0 |
| 6 | 62 | 561 | -0.134 | 35.4 | -2.1 |
| 7 | 66 | 670 | -0.128 | 36.7 | -2.2 |
| 8 | 70 | 818 | -0.122 | 37.9 | -2.4 |
| 9 | 72 | 916 | -0.119 | 38.6 | -2.4 |

FIG. 19(a)

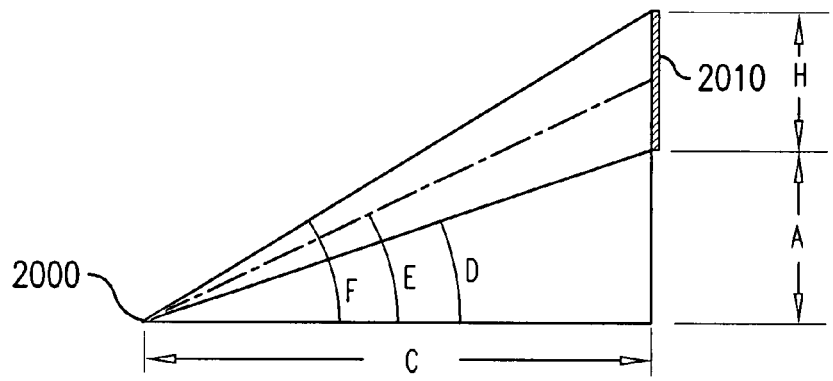
FIG.20(a)
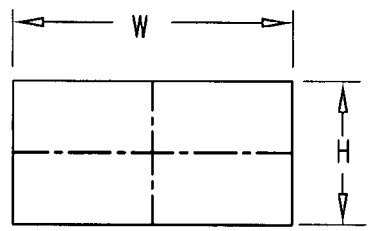
FIG.20(b)
| Screen diagonal (inch) | Screen diagonal (mm) | H (mm) | W (mm) | A | C | D | E | F |
|---|---|---|---|---|---|---|---|---|
| 60 | 1524 | 747 | 1328 | 260 | 297 | 41 | 65 | 74 |
H = Screen Height
W = Screen Width
A = Lens Axis to Screen Bottom
C = Convergence Point to Screen Plane
D = Lowest Ray Angle
E = Middle Ray Angle
F = Highest Ray Angle
FIG.20(c)

TOTAL INTERNAL REFLECTION FRESNEL-LENS AND DEVICES

CROSS REFERENCE TO RELATED APPLICATION

This application claims priority from Provisional Application No. 60/585,621, filed on Jul. 6, 2004, the entire contents of which are incorporated herein by reference.

BACKGROUND OF THE INVENTION

In general, projectors provide images by generating the image in a light source and projecting the same onto a screen. Referring to FIG. 1, a typical rear projection system or projection screen device includes a cabinet 110, a screen 140 installed on the front surface of the cabinet and where an image is formed, a light source 120, installed in the cabinet and generating and projecting an image, and reflection mirrors 100 and 130 reflecting the image input from the light source toward the screen. In the rear projection system having the above structure, an image projected in the rear of the screen and formed on the screen is viewed in front of the screen, that is, outside the cabinet.

Traditional rear projection televisions, as depicted in FIG. 1, generally are bulky, heavy, complicated to use, and expensive. A rear projection television or projection screen device having a flat panel display using projection technology, as shown in FIG. 2, is ultra-thin, lightweight, and has the potential to save cost by using fewer components.

Rear projection screens are made of either a lenticular lens or a diffuser or a combination of a lenticular lens and a diffuser that distributes or spreads the incident light in some angular distribution. FIG. 3 depicts such a rear projection screen without a fresnel lens. Before the screen 310, incident light 320 has a certain incident angle. Beyond the screen, the strongest component of the distributed light 330 is in the incident direction. As such, a viewer sees a varying brightness on the screen, resulting in an uneven image where the light is brightest in the center of the screen and darkest in the corners of the screen. In projection with a refractive-type fresnel lens, depicted in FIG. 4, the fresnel lens 420 redirects the incoming light 410 such that its incident angle, as well as the strongest component of the distributed light 430, are both normal to the projection screen 440. This gives a more even brightness to the screen. Accordingly, even when a viewer moves to the edge of the screen, the level of brightness at different positions decreases more evenly.

FIGS. 5 and 6 illustrate a projection television employing a fresnel lens. Such projection televisions have great depth. FIGS. 7 and 8 show a newer traditional projection television with an off-axis fresnel lens. The depth of such a projection television is considerably thinner due to the off-axis fresnel lens, which permits the light source to be directed from below.

The general fresnel lens structure can be conceptualized as either a collection of grooves between facets, or a collection of facets between grooves. With reference to the cross-sectional view of a fresnel lens shown in FIG. 22, the fresnel lens facets can be described with two angles. The face angle 2220 (also called "facet angle") is defined as the angle between the surfaces adjacent grooves. The groove angle 2210 is the angle formed between the input face (i.e. the bottom side) of one facet and the reflection face (i.e. the top side) of the same facet. The geometry of a facet having a curved side, as in the present invention, is described below.

FIG. 21 shows a conceptual illustration of the sections of a larger fresnel lens. The sections can be used for rear projection screens. The fresnel lens has an axis 2130 at the center of a plurality of concentric facets and grooves having predetermined facet and groove angles. In a rear projection display device in which incoming light enters perpendicularly to the face of the lens, or where the full lens field of the projection lens system is used, a center portion 2120 of fresnel lens 2100 is used as a fresnel lens for the display device. Rectangle 2110 provides an indication of a screen displaced from the center portion of fresnel lens 2100, as used in off-axis fresnel lenses where the incoming light enters at an angle. The size and shape of the portion of the lens to be used corresponds to the size and shape of the screen of the display device, i.e., the projection display. The term "off-axis" is used because the physical center of the fresnel lens 2110 is displaced from the axis 2130 of the larger fresnel lens 2100. In an off-axis lens, only the displaced portion is used. Any remaining portion of a larger fresnel lens from which the off-axis lens may have been derived is not used in the off-axis lens. Alternately, manufacturing techniques exist whereby only the off-axis portion of the fresnel lens is manufactured.

Although only the displaced portion of the lens is used in an off-axis fresnel lens, the off-axis lens is still considered to have an axis. The axis, however, may not appear on the actual lens. However, its position may be extrapolated from the elongated and arcuate concentric facets and grooves of the fresnel lens structure. For example, the off-axis fresnel lens 2110 has an axis 2130, even though the axis 2130 is at the lower edge of the lens. In other embodiments, the axis of an off-axis fresnel lens may even be substantially below or otherwise outside the lens border. Though it may not be visible on the lens itself, the axis of an off-axis fresnel lens can be extrapolated by determining the radius of a circle defined by any one of the concentric arcuate facets.

FIG. 20 shows a side view of a rear projection television with an off-axis fresnel lens. In FIG. 20(a), the light source 2000 is positioned below the screen 2010 having a height H and the incoming light rays strike the input surface of the screen at angles from the lowest ray angle D to the highest ray angle F, with a middle ray angle E. However, an off-axis lens may be used with any projection system where the light source is displaced from the center of the screen. FIG. 20(b) shows a front view of the projection screen with height H and width W. Specific dimensions of screen geometry and light incident angles for one embodiment are shown in FIG. 20(c).

FIG. 9 depicts the limited bending ability of a refractive-type prism, whereby the angle of bending $\delta$ is approximately half the prism angle $\theta$. Because the bending angle is limited to only half of the prism angle, the projection angle is limited, which limits the thinness of the projection system. Moreover, when $\theta$ is large, reflection loss becomes large. The light angle as well as loss depends on wavelength, thereby resulting in a color shift on the display screen.

FIG. 10 illustrates the greater bending ability of a reflective-type prism, whereby light is more fully reflected at the interface of the prism and air because of "total internal reflection" ("TIR"). While this kind of internal reflection is termed "total," it should not be construed as absolute, as slight reflective loss may occur due to abnormalities or impurities in the prism material, interference of the light with air or other substances, or for other reasons which may be apparent to one skilled in the art. Nonetheless, TIR has a reflection efficiency nearing 100%. The bending angle $\delta$ could reach 90°, thereby making the projection system even thinner. A higher output brightness results because of less reflection loss. In addition, there is virtually no color shift because the bending angle and loss have no wavelength dependence.

FIG. 11 shows that a reflective fresnel lens has low resolution and scrambled images. That is, image resolution is limited by the distance Σ between facets, and the image on every pitch is scrambled. Accordingly, the sequence 1-2-3-4 in the input light rays 1100 becomes 2-1-4-3 in the output light rays 1110.

Another problem associated with fresnel lenses and projection screens is the reduced contrast due to ambient light. On the projection screen, dark colors are represented by an absence of light. Thus, any ambient light on the projection surface will decrease contrast by causing dark colors to appear lighter. This ambient light can originate from the input surface or output surface of the fresnel lens.

Thus, there is need for a reflective fresnel lens system that has high resolution, corrects the problem of image scrambling, and which has improved contrast.

SUMMARY OF THE INVENTION

Fresnel lenses collimate incoming light rays to ensure more uniform brightness of projected light on projection screens. Off-axis TIR fresnel lenses reduce thickness, weight, and ease of use of rear projection systems by redirecting and collimating incoming light from an angle without the need for bulky mirrors. However, off-axis TIR fresnel lenses have suffered from low resolution and low contrast. Resolution in fresnel lenses is limited to facet pitch size due to scrambling of incoming light rays. Contrast in fresnel lenses is lowered by ambient light entering through the input side and output side of the fresnel lens. The present invention addresses these and other limitations of off-axis fresnel lenses through an improved and novel off-axis fresnel lens structure.

In one embodiment, the present invention is directed to an off-axis fresnel lens comprising an input surface and an output surface. Concentric, outwardly-extending, total internal reflection-type prism facets are disposed on the input surface, each facet comprising a top side being outwardly convex, and a bottom side being substantially flat. In other embodiments, the top side may be substantially flat and the bottom side may be outwardly convex, or both the top and bottom sides may both be flat. The above embodiments may further comprise an opaque layer disposed on flat sections on the input side of the prism structures, adjacent to the sides of the facets. The opaque layer may also be disposed between the prism facets and the output surface, having concentric-shaped generally transparent portions through which incoming rays reflected off the top side of each facet may pass without being blocked. In another embodiment, the opaque layer may be disposed on the output side of the fresnel lens, between the fresnel lens and the projection screen. In yet another embodiment, the opaque layer may be positioned horizontally forming an opaque louver between the input and output layers of the fresnel lens. Combinations of these dispositions and positions of the opaque layer or other structures which selectively block the incoming light in a controlled fashion may also be used.

BRIEF DESCRIPTION OF THE DRAWINGS

FIG. 12 shows an off-axis fresnel lens in which the top side of the facets is curved.

FIG. 14 shows an off-axis fresnel lens in which the top side of the facets is curved and an opaque layer is disposed between the facets and the output surface of the fresnel lens.

FIG. 15 shows an off-axis fresnel lens in which the top side and bottom side of the facets are flat and an opaque layer is disposed between the facets and the output surface of the fresnel lens.

FIG. 16 shows an off-axis fresnel lens in which the bottom side of the facets is curved.

FIG. 20 shows a side view of a rear projection television with an off-axis fresnel lens.

DESCRIPTION

One embodiment of the present invention, as illustrated in FIG. 12 and more fully in FIGS. 12(a) and 12(b), produces a higher resolution than that produced by the traditional TIR fresnel lens design with flat prisms. The images before and after the fresnel lens have the same order. Such a design provides a resolution surpassing the limit of the fresnel lens pitch length.

FIG. 12(a) shows a view of the input surface of the fresnel lens 1240. A number of off-axis TIR prism facets 1210 having facet pitch Δ are arranged in a concentric fashion on the input surface of the fresnel lens 1240. In one embodiment, the facet pitch is 0.1 mm, but the facet pitch may be anywhere in the range of 0.005 mm to 1 mm.

FIG. 12(b) shows a cross-sectional view of the fresnel lens 1240, projection screen 1250, and facets 1210. The facets 1210 have a top side 1200 and a bottom side 1220. Input light 1230 enters through the bottom side, reflects off the lower surface top side 1200, exits the fresnel lens 1240, and passes to the projection screen 1250. The top side 1200 is curved such that it causes the order of input light rays 1230 to be the same as the order of exit light rays 1270. This curvature is outwardly convex, with respect to the outside surface of the prism, and inwardly concave, with respect to the inside of the prism where the light rays strike. The curvature of the top side 1200 causes the input light rays which strike the top side 1200 of the facet at a point closest to the facet peak 1260 to appear on the projection screen 1250 at a direction 5 above input light rays striking the upper surface of the facet at points farther from the facet peak 1260. As a result, the order of the input light rays 1230 is preserved on the projection screen 1250, thereby preventing scrambling of the image at each pitch.

Figure 2:
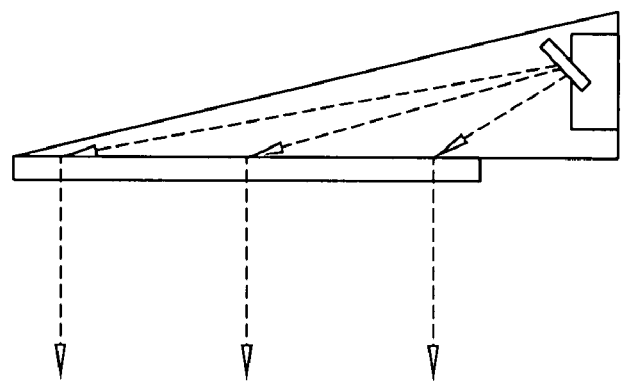
FIG. 2 shows an ultra-thin, light, and easy to use rear projection screen.
Figure 1:
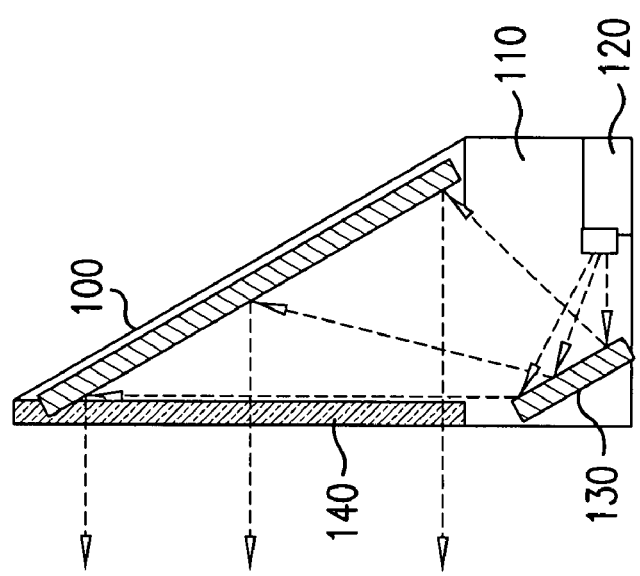
FIG. 1 shows a typical rear projection system including a light source, mirrors, and screen.
Figure 3:
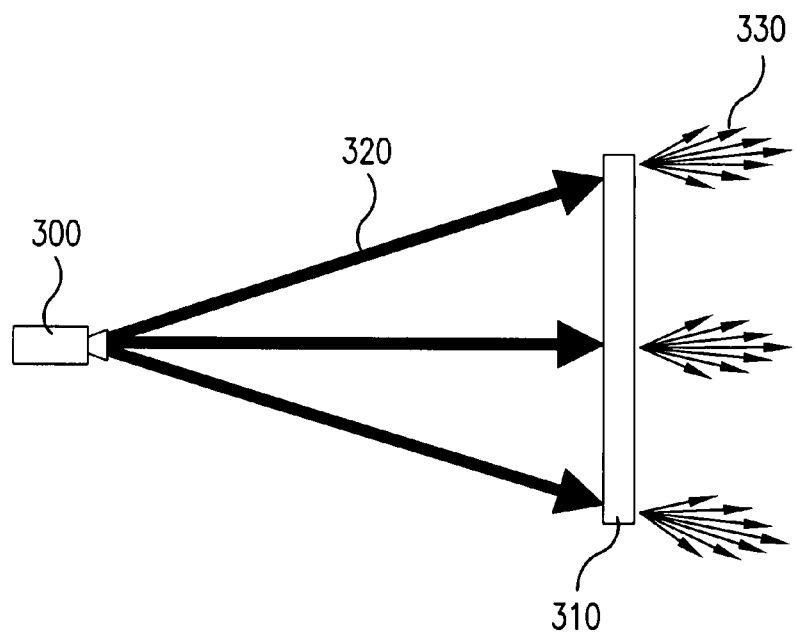
FIG. 3 shows a rear projection screen without a fresnel lens.
Figure 4:
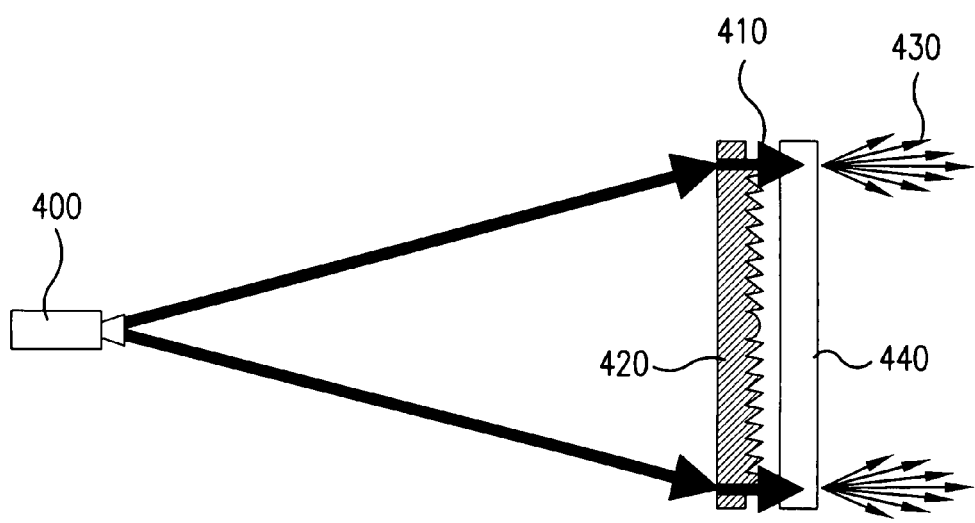
FIG. 4 shows a rear projection screen with a fresnel lens.
Figure 5:
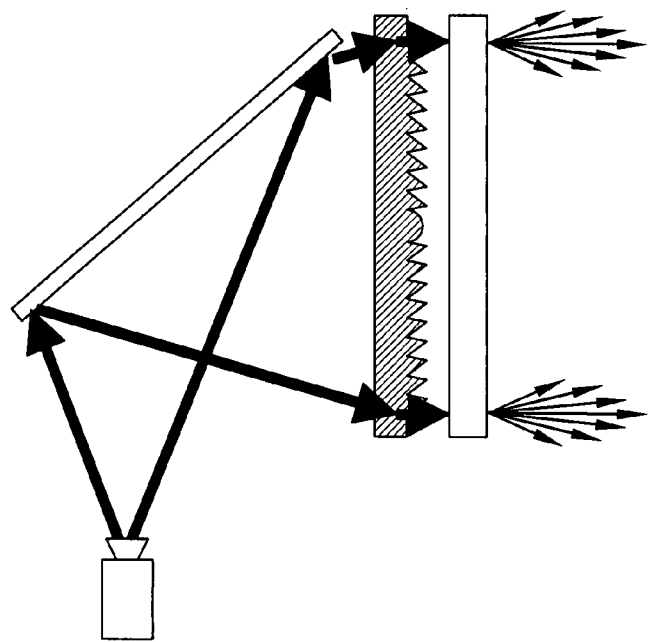
FIG. 5 shows a projection television employing mirrors and a fresnel lens.
Figure 6:
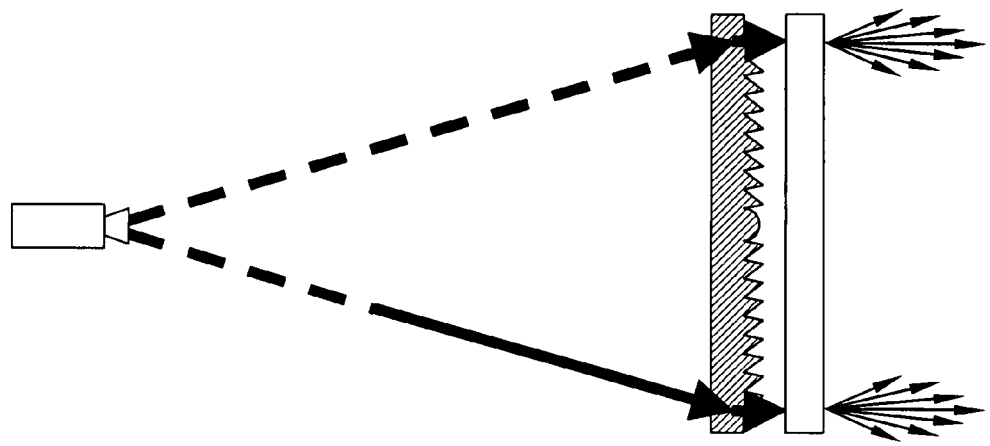
FIG. 6 shows the equivalent light path of a projection television employing mirrors and a fresnel lens.
Figure 7:
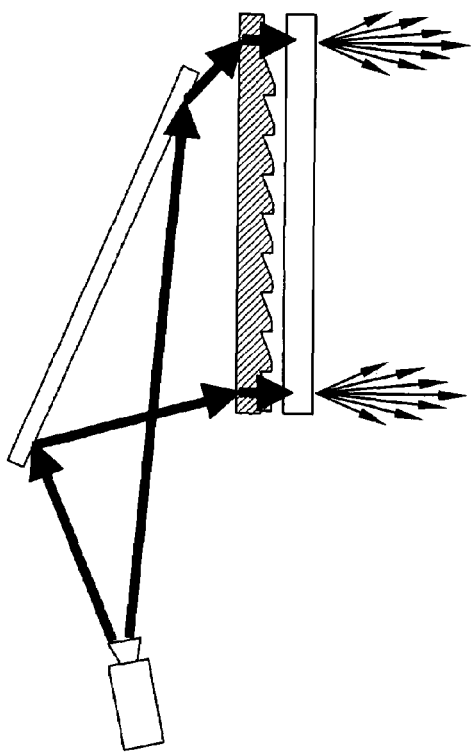
FIG. 7 shows a newer traditional projection television with an off-axis fresnel lens.
Figure 8:
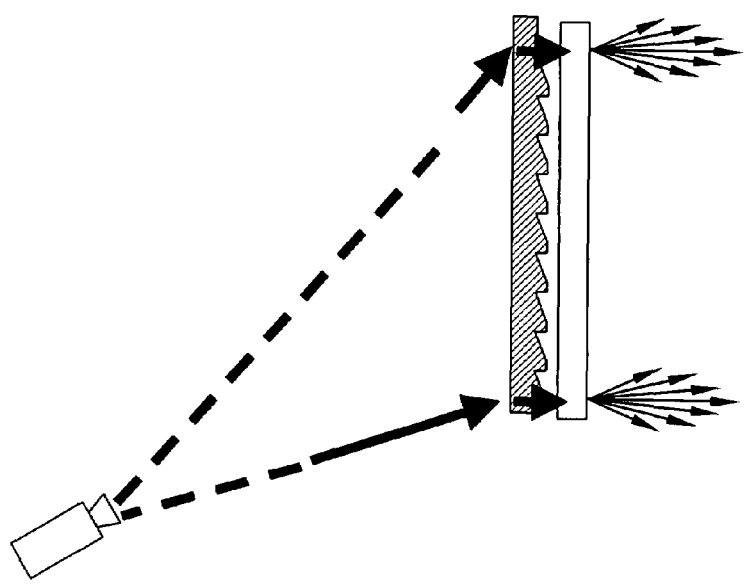
FIG. 8 shows the equivalent light path of a newer traditional projection television with an off-axis fresnel lens.
Figure 9A:
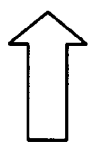
FIG. 9 shows the limited bending ability of a refractive-type prism.
Figure 9B:
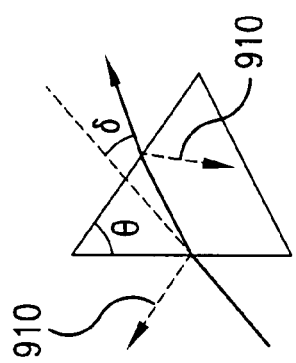
Figure 9C:
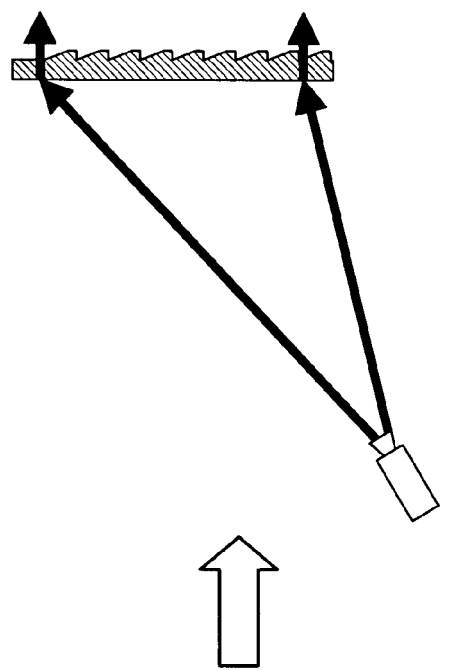
Figure 10C:
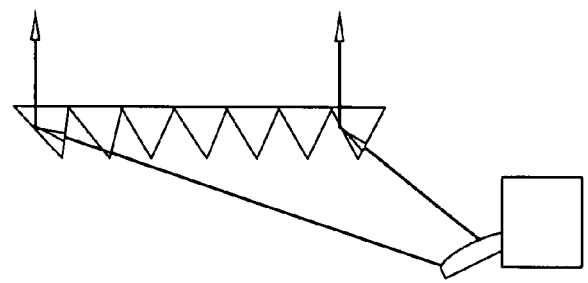
FIG. 10 shows the unlimited bending ability of a reflective-type prism.
Figure 10B:
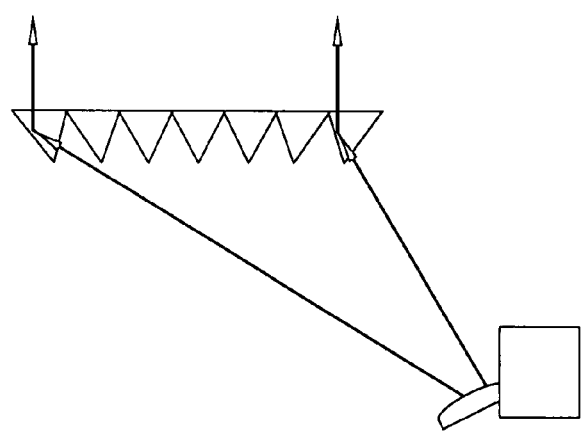
Figure 10A:
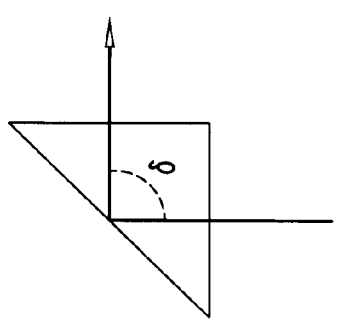
Figure 11:
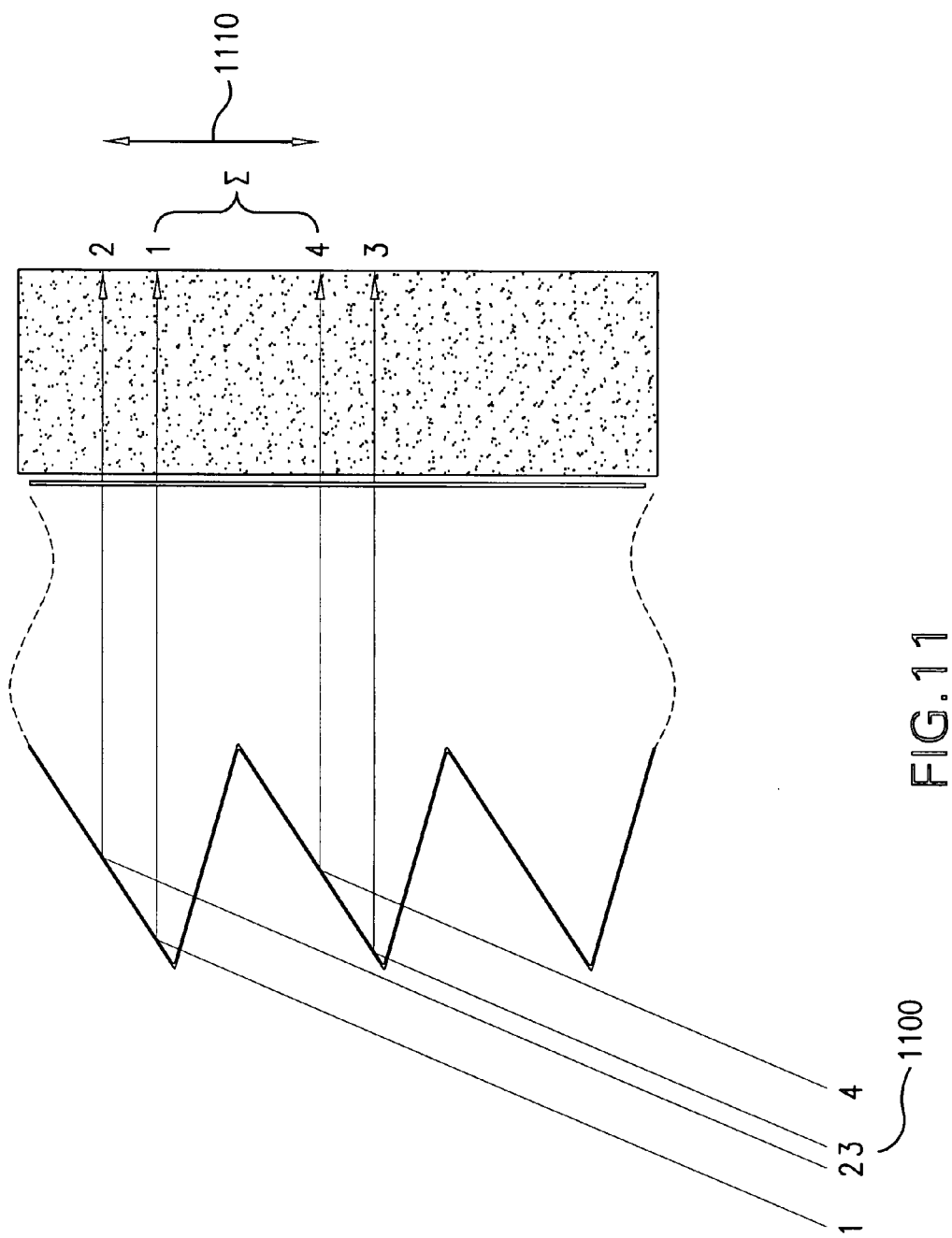
FIG. 11 shows that a reflective-type fresnel lens has low resolution and scrambled images.
Figures 13A, 13B:
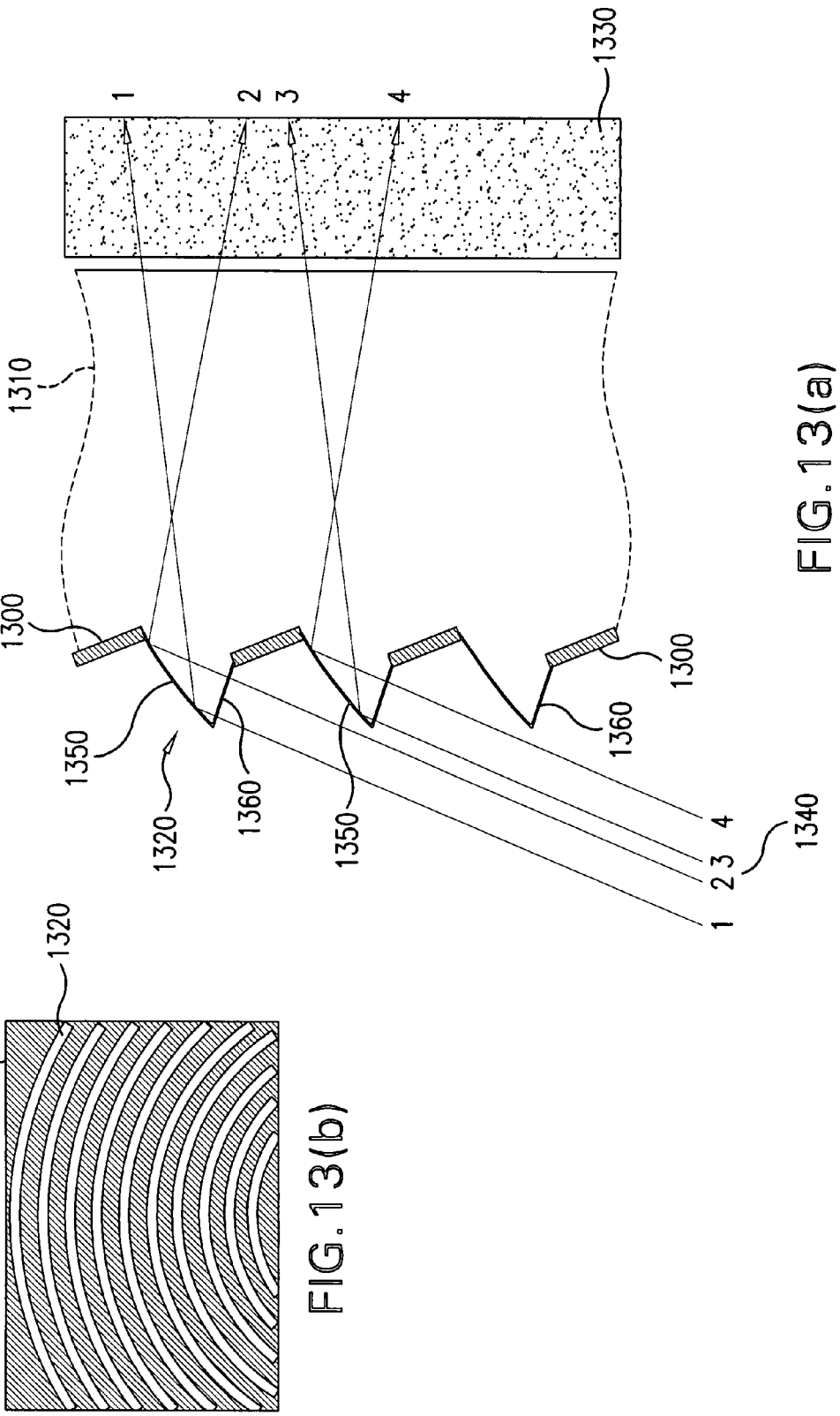
FIG. 13 shows an off-axis fresnel lens in which the top side of the facets is curved and an opaque layer is disposed adjacent to the sides of the facets.

Another embodiment of the present invention is illustrated in FIG. 13. FIG. 13(*a*) shows an opaque layer 1300 applied to the unused parts of the input surface between each facet 1320 of the fresnel lens 1310. During manufacturing, the opaque layer may be applied to the fresnel lens by printing, scribing, embossing, laser marking, photopolymerization, photomasking techniques, or other suitable means or techniques which may be apparent to one skilled in the art. Portions of the input surface between each facet are unused because the facets obstruct input light rays 1340 entering the facets 1320 from below, leaving an area between the top side 1350 of one facet and the bottom side 1360 of an adjacent facet. The opaque layer causes the blockage of this ambient light entering through the input surface of the fresnel lens 1310. The reduction of ambient light entering through the input surface of the fresnel lens will thereby increase the display contrast on the projection screen 1330. Moreover in the present invention, the fresnel lens can be laminated to a diffuser screen, reducing the loss of reflection between the traditional fresnel lens and projection screen. FIG. 13(*b*) shows the input surface of the off-axis fresnel lens 1310 with the opaque layer applied between the facets 1320.

In yet another embodiment of the present invention, as depicted in FIG. 14, the opaque layer provides even more contrast. Most ambient light is blocked, greatly increasing the contrast of the screen. In FIG. 14(*a*), input light rays 1440 are focused on generally transparent portions 1400 in the interior of the fresnel lens between the facets 1420 and the projection screen 1430. The opaque layer 1410 is positioned between the generally transparent portions 1400 in an area where light rays reflected off the facets do not pass. As shown in FIG. 14(*b*), the opaque layer 1410 blocks a large amount of ambient light because the area covered by the generally transparent portions 1400 is small compared to the total input surface area, leaving very little available surface area through which ambient light is able to pass.

An additional embodiment of the present invention, as shown in FIG. 15, produces good contrast but lower resolution. Opaque layers are applied to both the unused parts 1500 between each facet, as well as the space 1550 between the generally transparent portions 1510 through which light reflected off the upper side 1520 of each facet passes. But because the upper side 1520 of each facet is straight rather than curved, the order of incoming light rays 1530 is scrambled as output light rays 1540 on the projection screen 1560, resulting in lower resolution.

Another embodiment of the present invention, as illustrated in FIG. 16, produces a higher resolution than that produced by the prior art. This embodiment has a different shape from the embodiment in FIG. 12, but provides the same focus function as does FIG. 12 due to the curvature of the lower side 1610 of each facet. This curvature is outwardly convex, with respect to the outside surface of the prism where the light rays strike, and inwardly concave, with respect to the inside of the prism. Incoming light rays are bent as they pass through the lower side 1610 of each facet such that the order of incoming light rays 1620 is preserved as output light rays 1630 on the projection screen 1640, resulting in higher resolution. In other embodiments (not depicted), both the top side and bottom side of the facets may be substantially curved. The foregoing designs can provide a resolution surpassing the limit of the fresnel lens pitch length.

Figure 17:
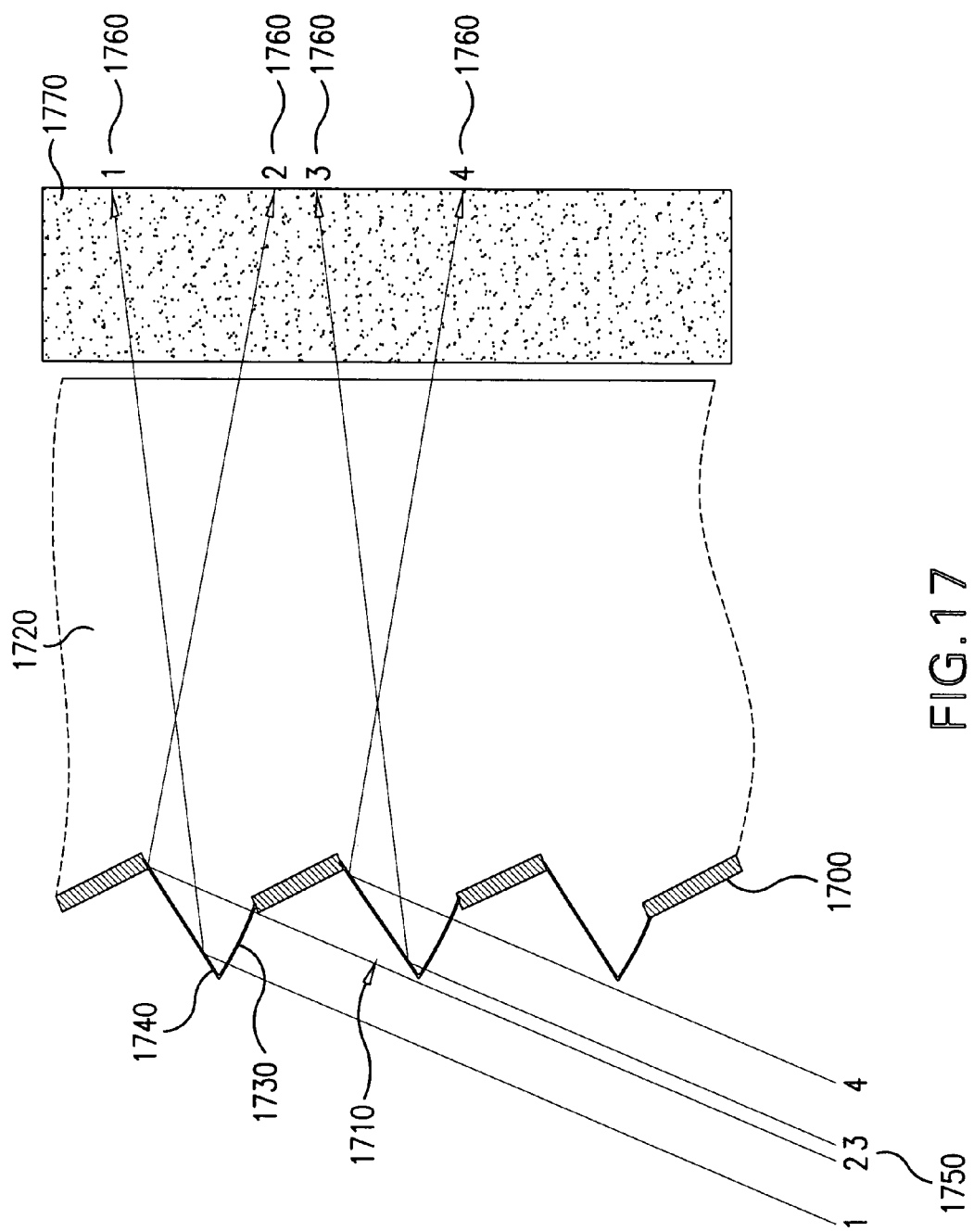
FIG. 17 shows an off-axis fresnel lens in which the bottom side of the facets is curved and an opaque layer is disposed adjacent to the sides of the facets.

Another embodiment of the present invention, as illustrated in FIG. 17, shows a opaque layer 1700 applied to the unused parts between each facet 1710 of the fresnel lens 1720. The opaque layer 1700 causes the blockage of ambient light, thereby increasing the display contrast. Incoming light rays are bent as they pass through the lower side 1730 of each facet 1710 such that the order of incoming light rays 1750 is preserved as output light rays 1760 on the projection screen 1770, resulting in higher resolution.

Figure 18:
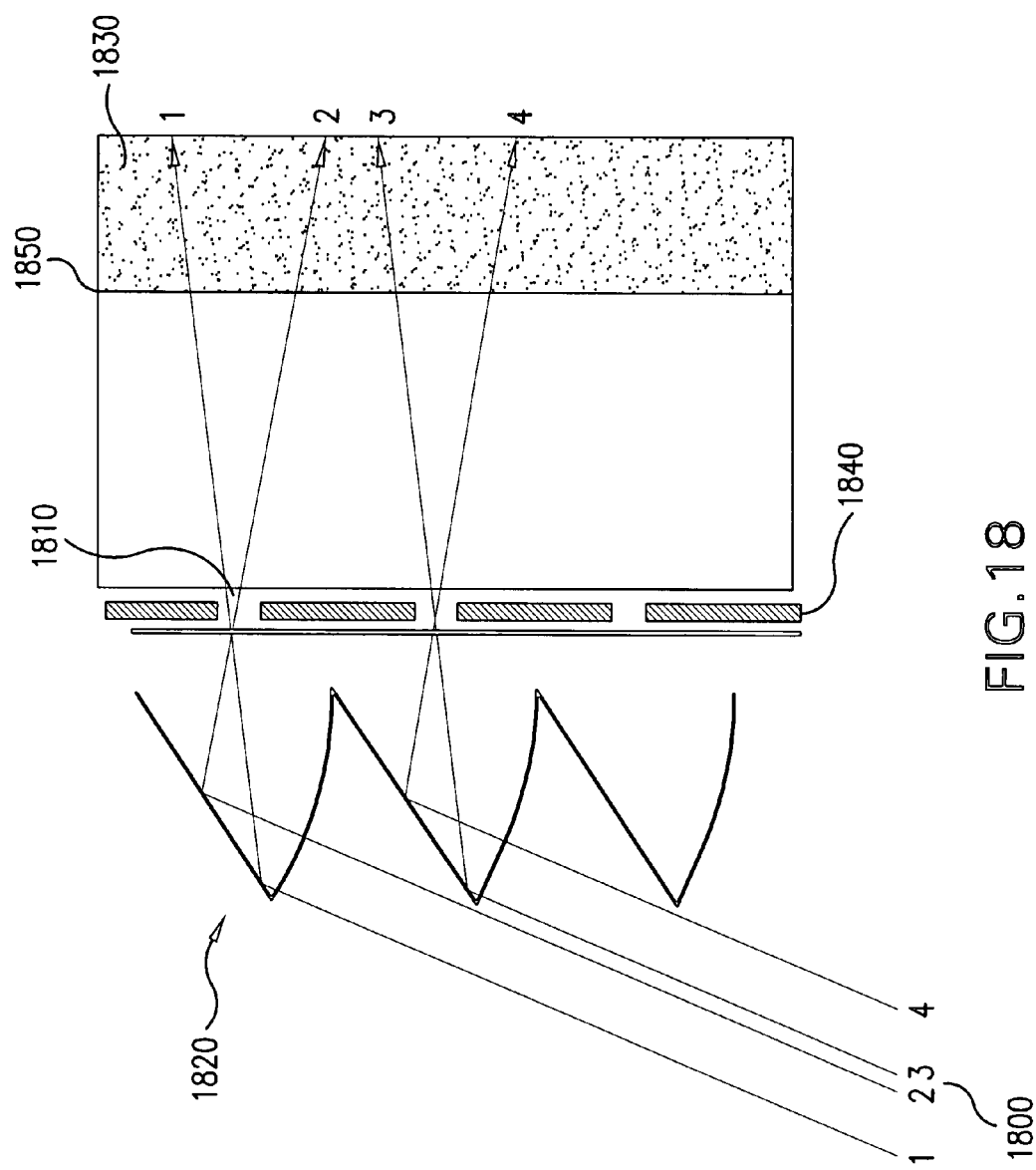
FIG. 18 shows an off-axis fresnel lens in which the bottom side of the facets is curved and an opaque layer is disposed between the facets and the output surface of the fresnel lens.

In another embodiment of the present invention, as depicted in FIG. 18, the opaque layer provides even more contrast. Input light rays 1800 are focused on generally transparent portions 1810 in the interior of the fresnel lens between the facets 1820 and the output surface 1850. The opaque layer 1840 is positioned between the generally transparent portions 1810. In this embodiment, most ambient light is blocked, greatly increasing the contrast of the projection display 1830.

Figure 23:
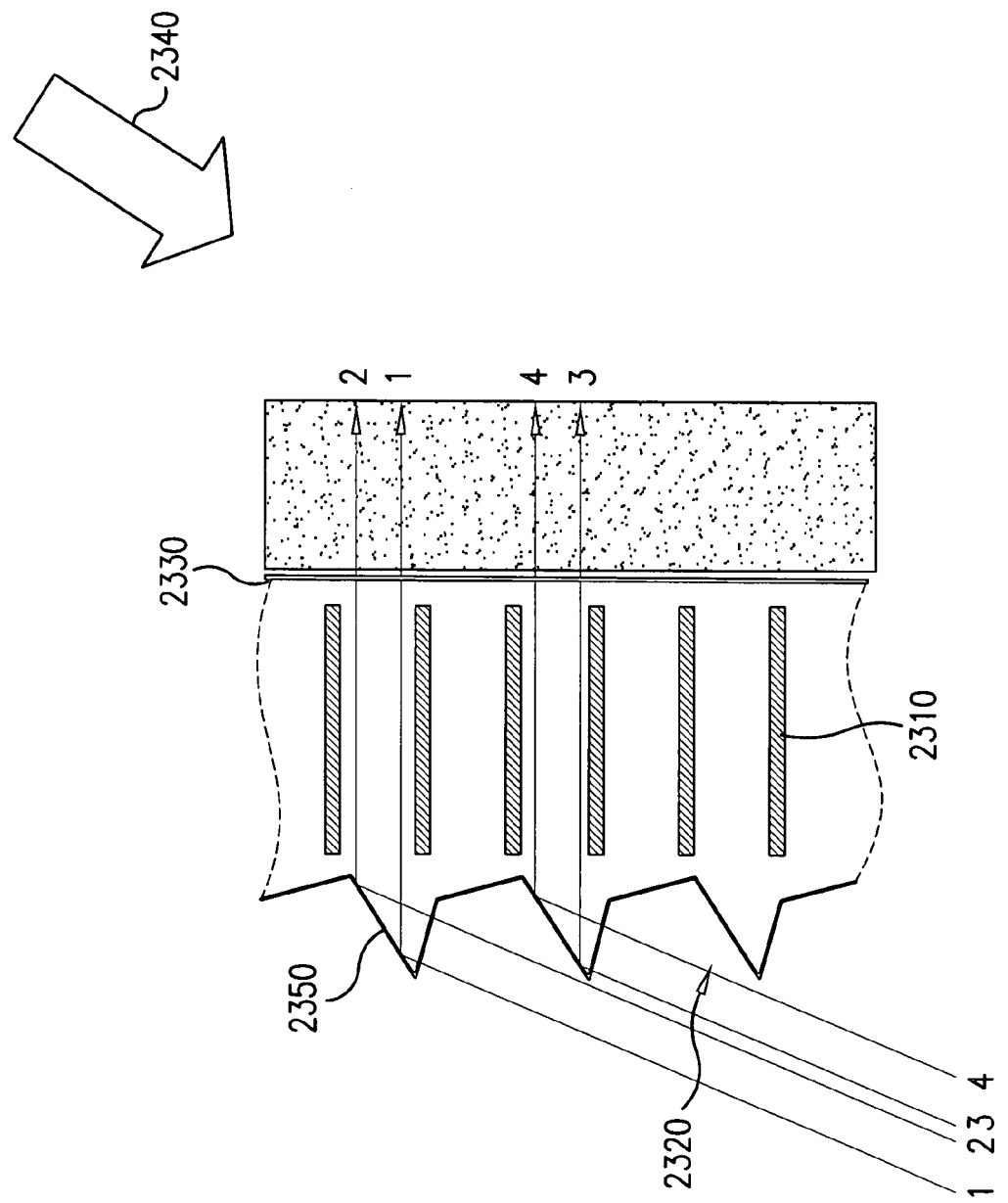
FIG. 23 shows an off-axis fresnel lens in which a generally opaque and horizontal louver is defined between the prisms and the output side.

In yet another embodiment of the present invention, as depicted in FIG. 23, a generally opaque and horizontal louver 2310 is defined between the prisms 2320 and the output side 2330. This opaque louver is effective to block ambient light 2340 that is not incident normally on the screen.

Thinness, high resolution, and increased contrast are achieved in these embodiments through the combination of the fresnel lens with facets having a curved surface, and the opaque layers. Moreover, in all these embodiments, the overall projection system will be even thinner by adding one or more mirrors in the projector side.

Figure 19B:
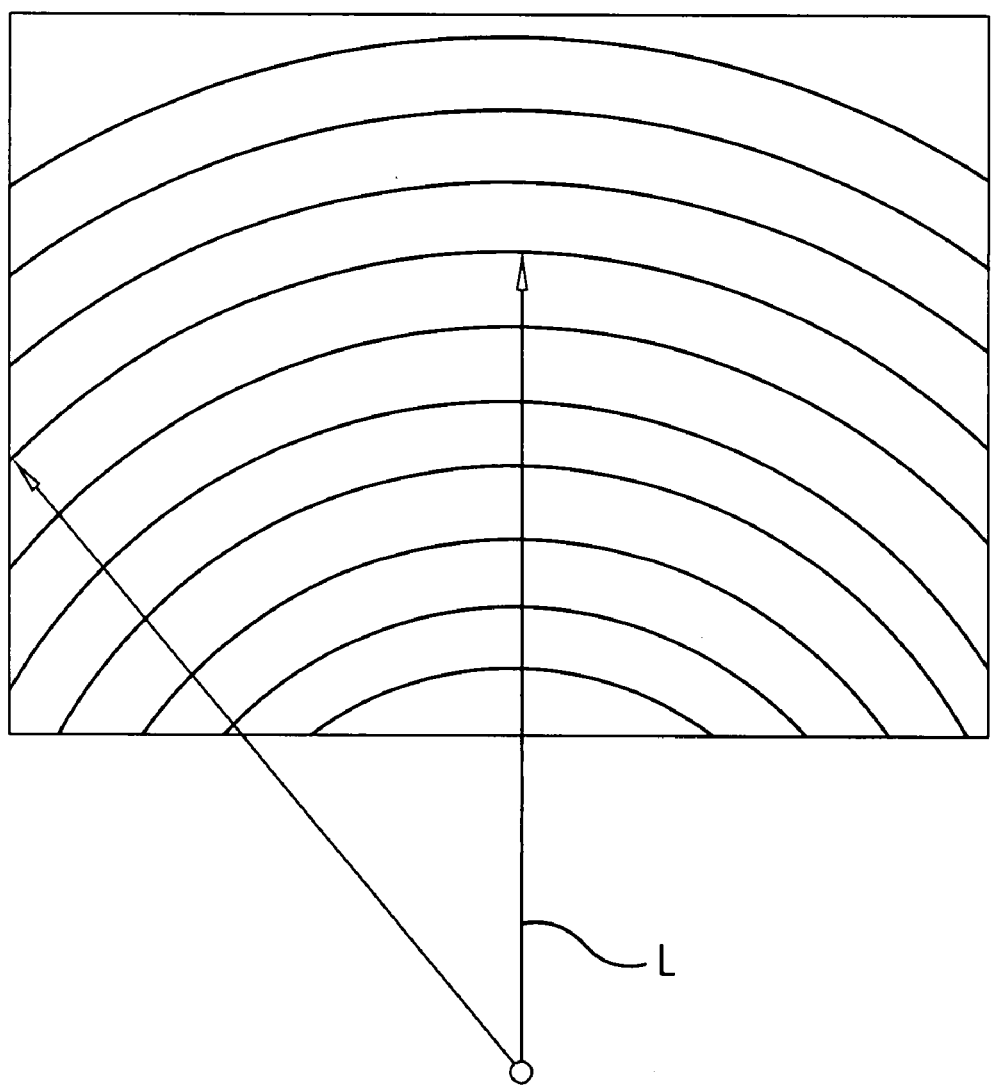
FIG. 19 shows details of the facet design.
Figure 19C:
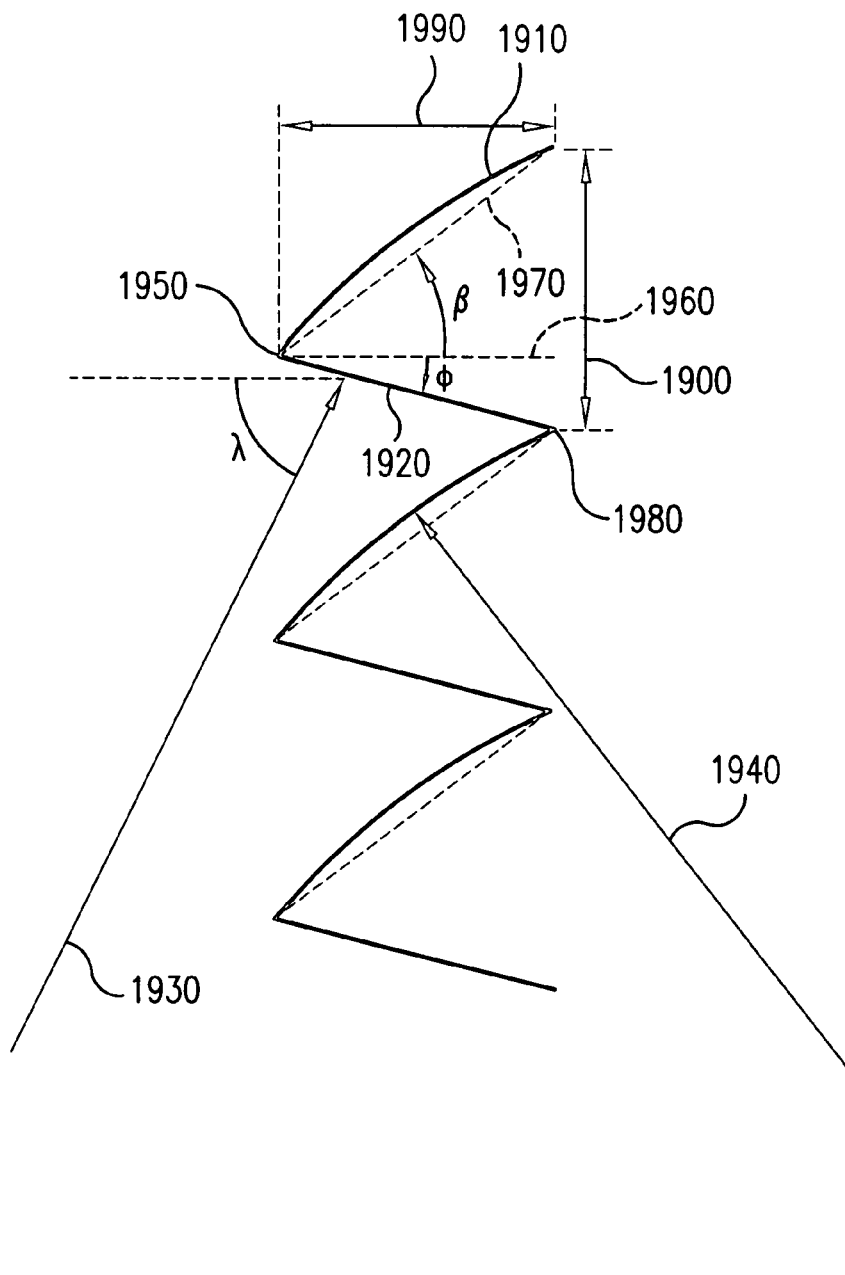
Figure 21:
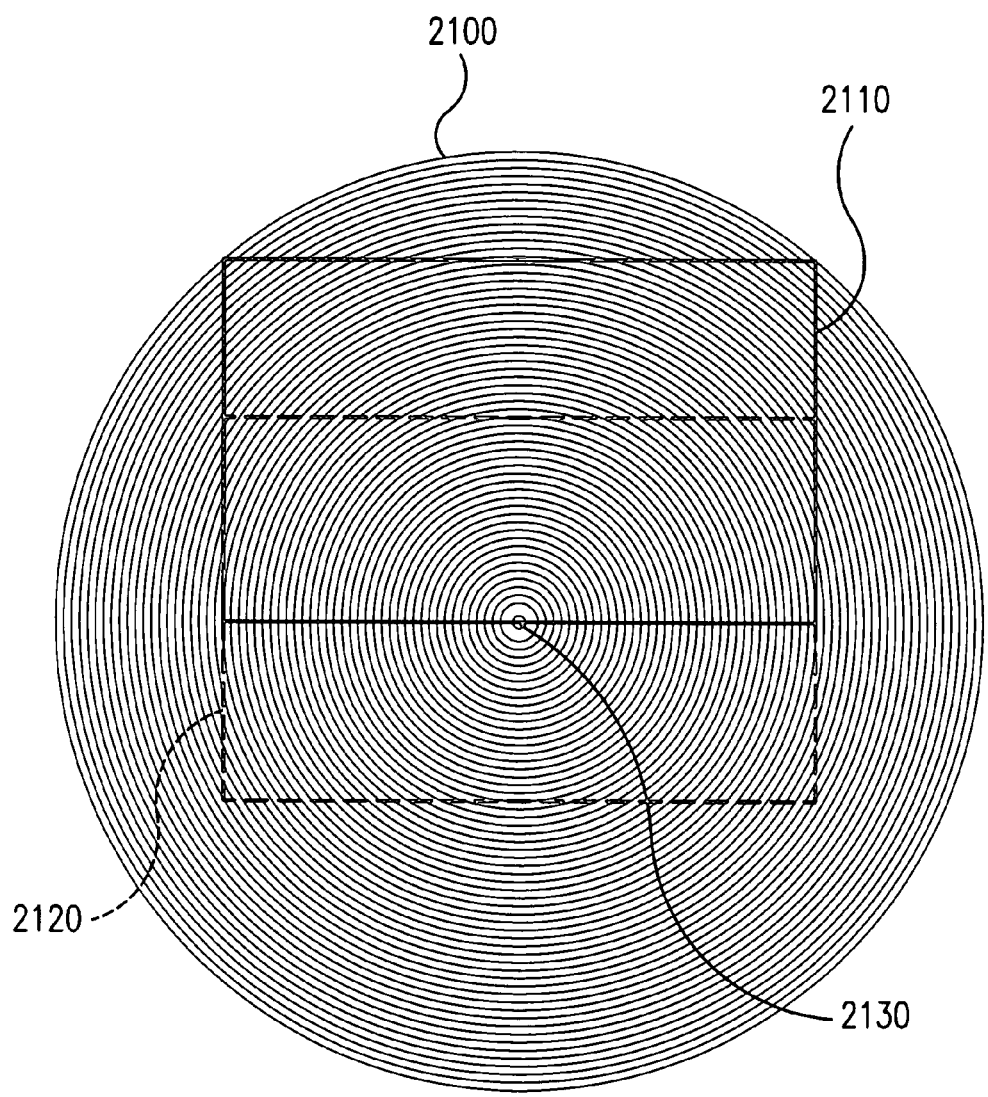
FIG. 21 shows a conceptual illustration of the sections of a larger fresnel lens.
Figure 22:
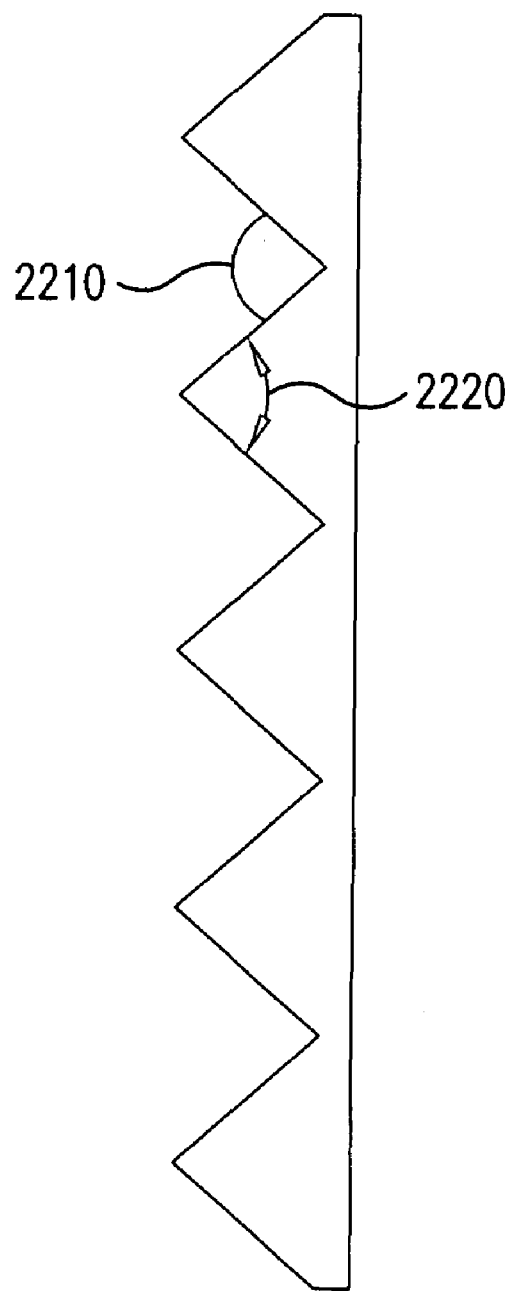
FIG. 22 shows the angles on an embodiment of a fresnel lens facet.

All embodiments of the present invention include a fresnel lens containing facets. FIG. 19 shows details of the facet design. FIG. 19(*c*) shows an exploded view of facets having a curved top side, as in one embodiment of the present invention. Facet pitch 1900 is the farthest distance between the top side and bottom side of a facet. In one embodiment, facet pitch is 0.1 mm and the thickness of the fresnel lens, which is the distance from the prism peak to the flat surface of the fresnel lens (not depicted in the figures), is 1 mm.

Facet pitch is generally the same for all facets in a given embodiment. For example, if facet pitch is given as 0.1 mm, then all facets in the fresnel lens of that embodiment will be 0.1 mm. Each facet also has a prism peak 1950, which is a point of a facet farthest from the base 1980 where the top side 1910 and bottom side 1920 converge. Facet depth 1990 is the distance from the prism peak 1950 to the prism base 1980. In the embodiment shown in FIG. 19(*b*), the top side 1910 of the facets is curved in the shape of an arc of a circle. In other embodiments, the top side may be substantially flat and the bottom side may be curved. In other embodiments, both the top and bottom sides of the facet may be substantially flat. In still other embodiments, both the top side and the bottom side of the facets may be substantially curved.

In one embodiment, the top side is defined as an arc of a circle having a radius 1940 of 2 mm. Incoming light rays 1930 have an incident light angle of λ. For the purposes of describing and measuring the facet dimensions, an imaginary facet bisector 1960 may be drawn from the tip of the facet to the base. Where one surface of the facet is longer than the other, as depicted in FIG. 19(*b*), the facet bisector divides the facet into two portions of unequal size. The facet bisector 1960 bisects the longitudinal extent of the facets, and is normal to the screen (not depicted). The prism bottom surface angle φ is the angle between the bottom side and the facet bisector. The prism top surface angle β is defined with reference to an imaginary arc connector 1970 which connects the endpoints of the curved top surface in the embodiment shown.

As described above, in some embodiments of the present invention, the top surface will be substantially flat and the bottom surface will be curved. The top and bottom surface angles will be computed as described above, except that the curvature of the top and bottom sides are reversed. Thus, the bottom side contains the arc connector and the bottom side angle is the angle from the facet bisector to the arc connector.

The exact dimensions of the facets in the various embodiments may be determined by optical design and analysis software products that will be known to those skilled in the art. For example, ZEMAX Development Corporation develops optical design software provides for modeling of fresnel lenses. For further design and manufacturing, optical design and analysis software can interface with computer aided design (CAD) software.

FIG. 19(*a*) shows sample dimensions of one embodiment of the present invention derived from optical design and analysis software. There will be numerous facets in a given fresnel lens. For example, if facet pitch is 0.1 mm and the height of the fresnel lens is 747 mm, there will be roughly 7,470 facets per screen. However, for simplicity, only nine areas are depicted in FIG. 19(*a*). These nine areas correspond to concentric facets of the fresnel lens at nine different distances from the lens axis. Incident light angle, facet depth, prism top surface angle, and prism bottom surface angle all vary with the distance from the facet to the axis. FIG. 19(*b*) shows ten different concentric facets, each facet being at a distance L from the imaginary lens axis, which is below the off-axis fresnel lens. FIG. 19(*b*) is not to scale with the nine areas of FIG. 19(*a*), which are not at equally spaced distances from the lens axis.

Although the present invention has been described in considerable detail with reference to certain preferred embodiments, other embodiments are within the scope of this invention. Therefore, the spirit and scope of the appended claims should not be limited to the description of the preferred versions contained herein.

The invention claimed is:

1. An off-axis fresnel lens, comprising:
   a lens having a first and a second side;
   an input surface on the first side and an output surface on the second side; and
   a plurality of concentric, outwardly-extending, total internal reflection-type prism facets disposed on the input surface defining a fresnel lens, each facet comprising:
   a top side being outwardly convex;
   a bottom side being substantially flat; and
   wherein the top side and bottom side intersect to form a prism peak.

2. The off-axis fresnel lens of claim 1, wherein the lens is incorporated into a projection screen device.

3. The off-axis fresnel lens of claim 2, wherein the projection screen device is a projection television system.

4. The off-axis fresnel lens of claim 2, wherein said projection screen device includes a projection screen that is laminated to the lens.

5. The off-axis fresnel lens of claim 1, wherein for each prism facet, the prism bottom surface angle is less than the prism top surface angle.

6. The off-axis fresnel lens of claim 1, wherein the distance from each prism peak to the output surface of the fresnel lens is from about 0.5 mm to about 5 mm.

7. The off-axis fresnel lens of claim 1, wherein the top side of each prism facet defines an arc of a circle having a radius from about 1 mm to about 20 mm.

8. The off-axis fresnel lens of claim 1, wherein the prism facet pitch is from about 0.005 mm to about 1 mm.

9. The off-axis fresnel lens of claim 1, wherein the distance from the prism peak to the prism base is from about 0.01 mm to about 1 mm.

10. The off-axis fresnel lens of claim 9, wherein the distance from the prism peak to the prism base is greatest at the facet closest to a lens axis and decreases with each successive facet until it is lowest at the facet farthest from the lens axis.

11. The off-axis fresnel lens of claim 1, wherein the incident light angle is from about 42 degrees to about 72 degrees.

12. The off-axis fresnel lens of claim 11, wherein the incident light angle is greatest at the facet closest to a lens axis and decreases with each successive facet until it is lowest at the facet farthest from the lens axis.

13. The off-axis fresnel lens of claim 1, wherein the prism top surface angle is from about 29.6 degrees to about 38.6 degrees.

14. The off-axis fresnel lens of claim 13, wherein the prism top surface angle is greatest at the facet farthest from a lens axis and decreases with each successive facet until it is lowest at the facet closest to the lens axis.

15. The off-axis fresnel lens of claim 1, wherein the prism bottom surface angle is from about 1.7 degrees to about 2.4 degrees.

16. The off-axis fresnel lens of claim 15, wherein the prism bottom surface angle is lowest at the facet closest to a lens axis and is highest at the facet farthest from the lens axis.

17. The off-axis fresnel lens of claim 1, further including a series of generally flat sections disposed adjacent to each side of each prism, and wherein each flat section is generally opaque.

18. The off-axis fresnel lens of claim 1, further including a generally opaque area defined between the prisms and the output side, the generally opaque area having concentric-shaped generally transparent portions through which incoming light rays reflected off the top side of each facet may pass.

19. The off-axis fresnel lens of claim 1, wherein the pitch for all said prism facets is constant.

20. An off-axis fresnel lens, comprising:
   a lens having a first and a second side;
   an input surface on the first side and an output surface on the second side;
   a plurality of concentric, outwardly-extending, total internal reflection-type prism facets disposed on the input surface defining a fresnel lens, each facet comprising a top side and a bottom side, the top side and the bottom side being substantially flat, and wherein the top side and bottom side intersect to form a prism peak;

a series of generally flat sections disposed adjacent to each side of each prism, and wherein each flat section is generally opaque; and a generally opaque area defined between the prisms and the output side, the generally opaque area having concentric-shaped generally transparent portions through which incoming rays reflected off the top side of each facet may pass.

21. The off-axis fresnel lens of claim 20, wherein the lens is incorporated into a projection screen device.

22. The off-axis fresnel lens of claim 21, wherein the projection screen device is a projection television system.

23. The off-axis fresnel lens of claim 21, wherein said projection screen device includes a projection screen that is laminated to the lens.

24. An off-axis fresnel lens, comprising:

a lens having a first and a second side;

an input surface on the first side and an output surface on the second side; and a plurality of concentric, outwardly-extending, total internal reflection-type prism facets disposed on the input surface defining a fresnel lens, each facet comprising:
a top side being substantially flat;
a bottom side being outwardly convex; and
wherein the top side and bottom side intersect to form a prism peak.

25. The off-axis fresnel lens of claim 24, wherein the lens is incorporated into a projection screen device.

26. The off-axis fresnel lens of claim 25, wherein the projection screen device is a projection television system.

27. The off-axis fresnel lens of claim 25, wherein said projection screen device includes a projection screen that is laminated to the lens.

28. The off-axis fresnel lens of claim 24, further including a series of generally flat sections disposed adjacent to each side of each prism, and wherein each flat section is generally opaque.

29. The off-axis fresnel lens of claim 24, further including a generally opaque area defined between the prisms and the output side, the generally opaque area having concentric-shaped generally transparent portions through which incoming light rays reflected off the top side of each facet may pass.

30. An off-axis fresnel lens, comprising:

a lens having a first and a second side;

an input surface on the first side and an output surface on the second side;

a plurality of concentric, outwardly-extending, total internal reflection-type prism facets disposed on the input surface defining a fresnel lens, each facet comprising a top side and a bottom side, the top side and the bottom side being substantially flat, and wherein the top side and bottom side intersect to form a prism peak; and a generally opaque and generally horizontal louver defined between the first side and the second side.

31. The off-axis fresnel lens of claim 30, wherein the lens is incorporated into a projection screen device.

32. The off-axis fresnel lens of claim 31, wherein the projection screen device is a projection television system.

33. The off-axis fresnel lens of claim 31, wherein said projection screen device includes a projection screen that is laminated to the lens.

* * * * *